United States Patent [19]

Jones et al.

[11] Patent Number: 5,217,742
[45] Date of Patent: Jun. 8, 1993

[54] WATER-AND-OIL EMULSION AND PROCESS FOR PREPARING SUCH EMULSION

[75] Inventors: Malcolm G. Jones, Stevington Beds.; Ian T. Norton, Rushden, both of England

[73] Assignee: Van den Bergh Foods Co., Division of Conopco, Inc., Lisle, Ill.

[21] Appl. No.: 718,717

[22] Filed: Jun. 21, 1991

[30] Foreign Application Priority Data

Jun. 22, 1990 [EP] European Pat. Off. ........... 90306860
Jul. 6, 1990 [EP] European Pat. Off. ........... 90307387

[51] Int. Cl.$^5$ ............................................. A23D 7/00
[52] U.S. Cl. .................................. 426/602; 426/603; 426/604; 426/663
[58] Field of Search ............... 426/602, 603, 604, 605, 426/663

[56] References Cited

U.S. PATENT DOCUMENTS

| | | |
|---|---|---|
| 3,628,968 | 4/1968 | Noznick et al. |
| 3,935,324 | 1/1976 | Persmark et al. |
| 3,944,680 | 3/1976 | van Pelt et al. |
| 3,979,526 | 9/1976 | Suzuki et al. |
| 4,107,343 | 8/1978 | Petricca |
| 4,396,638 | 8/1983 | Edo et al. |
| 4,798,734 | 1/1989 | Kaneda |

FOREIGN PATENT DOCUMENTS

| | | |
|---|---|---|
| 095001 | 11/1983 | European Pat. Off. |
| 098663 | 1/1984 | European Pat. Off. |
| 294119 | 12/1988 | European Pat. Off. |
| 379747 | 8/1990 | European Pat. Off. |
| 420315 | 4/1991 | European Pat. Off. |
| 2315856 | 3/1977 | France |
| 58-086056 | 5/1983 | Japan |
| 58-116647 | 7/1983 | Japan |
| 2080325 | 9/1984 | United Kingdom |
| 2162039 | 6/1989 | United Kingdom |
| 04525 | 6/1988 | World Int. Prop. O. |

OTHER PUBLICATIONS

European Search Report & Annex.
Food Colloids, Edited by Bee, R. D. et al. Special Pub. #75, pp. 272-282.

*Primary Examiner*—Joseph Golian
*Assistant Examiner*—Evan Federman
*Attorney, Agent, or Firm*—A. Kate Huffman

[57] ABSTRACT

The present invention is concerned with a plastic bicontinuous emulsion containing 5-21 wt. % fat and comprising a continuous aqueous phase, wherein the stress observed at the F-strain when the stress is registered as a function of the strain applied, is 10%, preferably at least 25% higher than the stress observed for the aqueous phase composition at the same strain.

14 Claims, 1 Drawing Sheet

WATER-AND-OIL EMULSION AND PROCESS FOR PREPARING SUCH EMULSION

FIELD OF THE INVENTION

The present invention relates to a plastic emulsion containing 5-21 wt. % fat and comprising a continuous aqueous phase. In particular the present invention is concerned with water-continuous spreads, toppings and mayonnaise containing 5-21 wt. % fat.

STATE OF THE ART

In principle two types of emulsions can be distinguished, namely fat-continuous and water-continuous emulsions. The fat-continuous plastic emulsions known in the art usually contain a dispersed aqueous phase, whereas the known water-continuous plastic emulsions normally contain a dispersed fat phase. Both types of emulsions have their benefits and drawbacks. In general, fat-continuous emulsions are microbiologically more stable, and have a more desirable rheology, in particular plasticity. Water-continuous emulsions on the other hand, break down more easily in the mouth and are less sensitive to the properties of the fat used.

In EP-A-0 098 663 an emulsion is described which displays an intermediate structure partway between a fat-continuous emulsion and a water-continuous emulsion. Such an emulsion is denoted as bi-continuous, because it contains a continuous fat phase and a continuous water phase. It is prepared by shear-churning an oil-in-water cream in the absence of an air/water interface. The emulsion of the reference contains 25-65% fat. But creams having a fat level lower than 25 wt % are said to be extremely difficult to be prepared according to the invention.

In EP-A-0 420 315 a preparation of a very low fat spread is described. This reference has regard to a fat continuous emulsion with a water phase. It is remarked, incidentally, that the aqueous phase may be continuous. However, the specification deals only with emulsions containing a dispersed water phase.

There is a strong need for edible emulsions with a fat content below 25 wt % and particularly for emulsions with a continuous water phase, because of their beneficial organoleptic properties.

SUMMARY OF THE INVENTION

It has now been found that plastic bi-continuous emulsions of very low fat content, i.e. less than 25 wt % fat can be prepared, using a proper choice of ingredients and processing steps. These emulsions combine a number of the advantages of water-continuous emulsions and fat-continuous plastic emulsions. By the term "plastic emulsion" as used throughout this application is meant an emulsion having a rheology displaying a so called failure area in its stress-strain curve.

DESCRIPTION OF THE FIGURE

The stress-strain curve is obtained by measuring the stress as a function of the strain applied.

Figure 1:
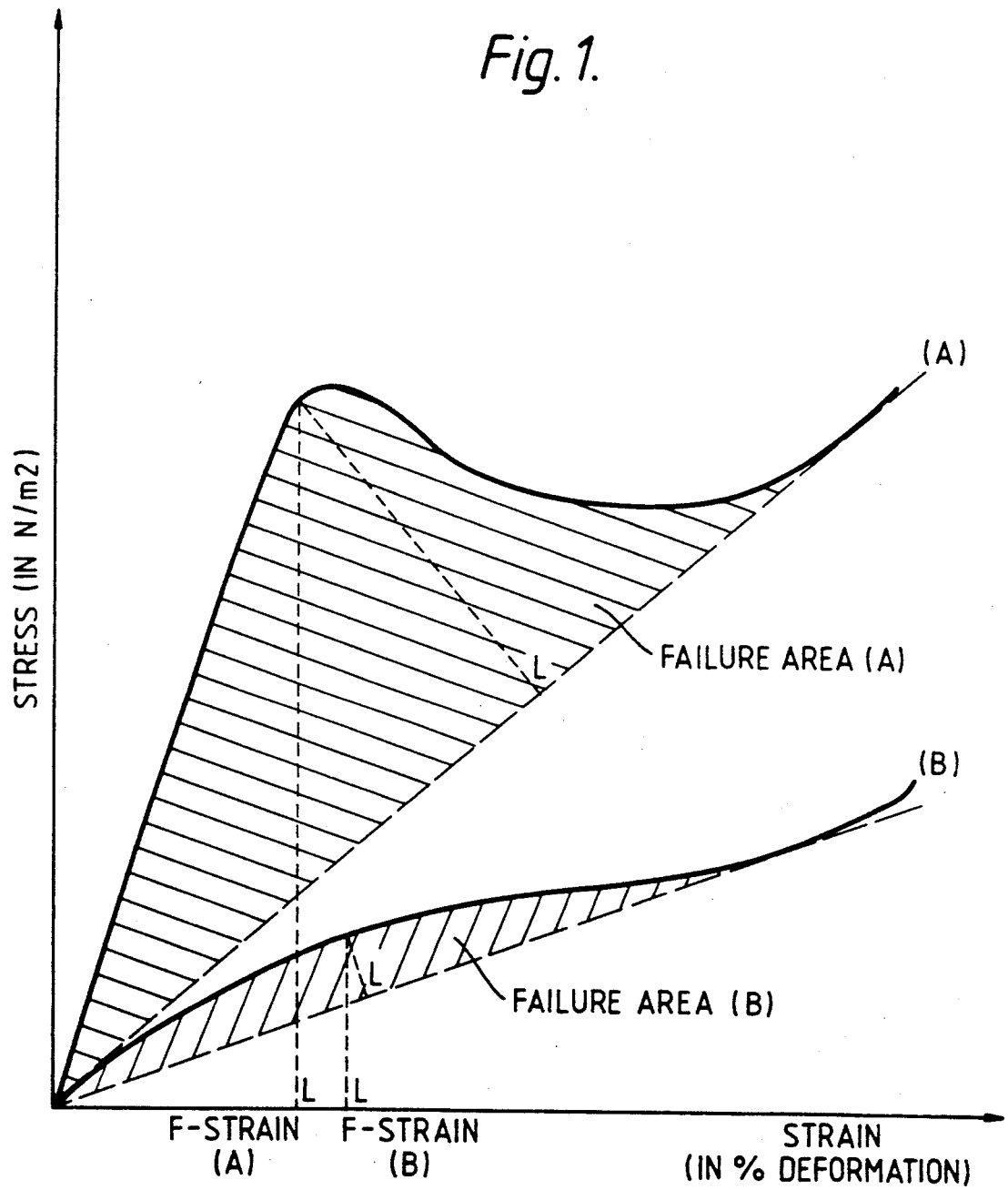
In FIG. 1 an example is given of two stress-strain curves (A) and (B), characteristic of plastic emulsions. Often plastic emulsions display a local stress maximum in their stress-strain curve. The strain at which said stress maximum is observed is the so-called "failure strain" and generally corresponds to the amount of strain required to deform the sample to such an extent that it does not return to its initial shape. If an amount of strain is exerted which is less than the failure strain, the sample will return to its initial shape and thus displays an essentially elastic rheology.

Some plastic emulsions, so-called "non-typical emulsions", do not exhibit a clear failure strain, as illustrated by curve (B), but they have in common with typical plastic emulsions that the first derivative of the stress-strain curve shows a clear minimum, generally at below 75% deformation, preferably at below 65% deformation. Furthermore non-typical plastic emulsions, like typical plastic emulsions produce a stress-strain curve showing a failure area. Here the failure area is defined as the area confined by the tangent to the curve and said curve. Generally the failure area exceeds 5%, preferably at least 8% of the area below the curve; the latter area being calculated from origin to point of contact.

Since non-typical plastic emulsions do not produce stress-strain curves comprising a local stress-strain maximum we have introduced a new parameter, the so-called F-strain which can be calculated for both typical and non-typical plastic emulsions and which, for typical plastic emulsions, does not differ substantially from the failure strain. The F-strain is the strain found by determining the local maximum of the stress-strain curve with respect to the tangent to said curve. The strain at which said maximum is found is the F-strain.

DETAILED DESCRIPTION

The plastic emulsions according to the present invention combine the favorable rheology of water-in-oil emulsions with an excellent oral response.

It has appeared to be very desirable to employ an aqueous phase composition which contains a substantial amount of thickening and/or gelling agent in order to enhance its viscosity. In particular it has been found that if the aqueous phase composition has a viscosity of more than 3 mPa.s when measured at a shear rate of 1709 s$^{-1}$ and 10° C., the emulsion is less prone to creaming, which is the phenomenon of phase separation observed for water-continuous emulsions, in particular oil-in-water emulsions. Since the present bi-continuous emulsion is normally prepared from an oil-in-water emulsion, creaming of the latter emulsion will have a detrimental effect on the preparation.

According to one embodiment of the present invention the aqueous phase composition is, however, non-gelling and contains just enough thickening and/or gelling agent to meet the above viscosity requirement. An aqueous phase composition is said to be gelling, when that said composition contains one or more gelling agents at a concentration level of at least the critical concentration of these gelling agent(s). Conversely the term non-gelling composition is used to indicate that the critical concentration is not reached.

The critical concentration of a gelling agent is the lowest concentration at which said gelling agent forms a gel. The critical concentration of gelling agent(s) in the aqueous phase composition of a plastic emulsion is to be determined in an aqueous system which has exactly the same composition as the aqueous phase composition to be incorporated into said plastic emulsion, except for the gelling agent(s) whose concentration has to be varied in order to determine the critical concentration.

The critical concentration can be calculated from the shear modulus of a series of samples containing varying concentrations of gelling agent or of a mixture of agents which together act as a gelling agent (Br. Polymer J. 17 (1985), 164). When the critical concentration is to be determined for a combination of agents, then the method is analogous to the procedure described above. The weight ratio of the agents is kept constant and the concentration of the mixture is varied, with the effect that the mixture is treated as a single gelling agent.

The use of an aqueous phase which is not gelled offers the advantage that the products according to this embodiment of the invention disperse in the mouth very rapidly. As a consequence they generally do not display a waxy mouthfeel.

According to an alternative embodiment the aqueous phase composition in the present emulsion is of purpose gel-forming. The application of a gel-forming aqueous composition offers the advantage that loss of water on spreading is effectively prevented. Furthermore the use of a gelling aqueous phase can be advantageous since it improves the consistency of the product at higher temperatures when the fat phase contains little or no solid fat. The latter property is particularly appreciated in products which are also sold in countries with a warm climate.

According to one aspect of the above embodiment an F-strain can be observed in the stress-strain curve for the gel-forming aqueous phase, like for the emulsion it forms part of. According to a preferred embodiment for the aqueous phase system the F-strain is observed at a substantially higher strain than for the emulsion. More preferably the F-strain observed for the aqueous phase system exceeds the F-strain of the emulsion by at least 5% deformation.

The gelling agents used for the present emulsion are generally biopolymers. Preferably they are chosen from the group comprising gums, proteins and carbohydrates such as starches. More preferably the gelling agents are selected from the group consisting of: gelatin, kappa-carrageenan, iota-carrageenan, alginate, agar, gellan, pectin, starch, whey protein, sodium caseinate, bovine serum protein, soy protein and microcrystalline cellulose. The term starch includes beside native starches also modified starches such as cross-linked starches and hydrolyzed starches.

The present bi-continuous emulsion may also contain water binding agents such as guar gum.

As observed above, the present bi-continuous emulsion is characterized by a relatively high electric conductivity. Even more characteristic is the ratio of the conductivity of the aqueous phase and the conductivity of the emulsion. Preferably said ratio is less than 100, which is an indication that the emulsion is water-continuous. According to a very preferred embodiment of the invention this ratio is less than 10.

Whether or not an emulsion is water-continuous, in general, can easily be established by microscopy or by measuring the electric conductivity of the emulsion. Normally the aqueous phase contains electrolytes which make said phase highly conductive. If the emulsion is water-continuous a high conductivity will be measured, being at least 100 microSiemens/cm at 5° C.

This is in contrast with an emulsion which contains besides the continuous fat phase only a dispersed aqueous phase and which emulsion therefor has a very low conductivity. In case of a bi-continuous emulsion a high conductivity is measured, indicating that the product is water-continuous. Such bi-continuous products can be distinguished from oil-in-water emulsions, however, by comparison stress values of the bi-continuous emulsion and its water phase:

As contrasted to oil-in-water emulsions, the fat in the present bi-continuous emulsion contributes substantially, and generally beneficially to the plasticity of said product. The latter characteristic contribution becomes apparent when comparing the stress-strain curve found for the bi-continuous dispersion with the stress-strain curve for the aqueous phase. For a traditional plastic oil-in-water emulsion an F-strain can clearly be identified for both the emulsion and the aqueous phase composition. The stress-strain curves will be essentially identical in shape, which means that the fat hardly contributes to the plasticity. Plastic bi-continuous emulsions, on the other hand, show a stress-strain curve for which an F-strain can be identified, which is characterized in that the stress value at the F-strain is substantially higher than the stress value observed for its aqueous phase at the same strain, i.e. the F-strain of the emulsion.

The plastic bi-continuous emulsion according to the invention is therefore characterized in that the stress observed at the F-strain, when the stress is registered as a function of the strain applied, is at least 10%, preferably at least 25% higher than the stress observed for the aqueous phase composition at the same strain value. Sometimes the stress value of the aqueous phase is immeasurable small and will be indicated by zero.

The stress-strain curve whenever referred to in this specification is always measured at 10° C. after equilibration at said temperature for a sufficiently long period of time to allow gelation to complete. Generally after 1 week of equilibration the gelation process has finished completely. The stress-strain relationship can suitably be measured by means of an Instron ™ Universal Tester fitted with a 1000N load cell. An oversize crosshead should be used to compress a cylindrical sample (12.5 mm radius 30 mm height) at a crosshead speed of 50 mm per minute. It should be realized that local maxima in the stress-strain curve resulting from, for instance, inaccuracies in the measurement procedure are to be disregarded. In case of doubt the stress-strain curve should be measured a number of times so as to establish whether or not an initially observed maximum was caused by a measurement error.

According to a very preferred embodiment of the invention the F-strain for the present emulsion is observed at less than 50%, and even more preferably at less than 30% deformation.

The difference in stress observed between the emulsion and its aqueous phase is believed to be caused by the fat-crystal network present in the continuous fat phase. Thus the present emulsion should necessarily contain some solid fat at ambient temperature. Preferably the fat present in the emulsion has an $N_{20}$-value of at least 10.

The N-value for a fat at a certain temperature t is expressed as $N_t$. It indicates the equilibrium solid fat content of the composition at that temperature t, expressed in weight % of that composition as established by means of the NMR-method described in Fette, Seifen, Anstrichmittel 80 (1978), 180–186.

The fat present in the emulsion according to the invention should contain sufficient solid fat at ambient temperature to form a fat-crystal network, but on the other hand at mouth temperature should contain little solid fat. Accordingly, in a preferred embodiment, the fat has an $N_{35}$ of less than 5 and an $N_{20}$ in the range of 15 to 90. The total amount of fat should be at least 5 wt %, but should not exceed 21 wt % of the emulsion.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di-and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification the term 'polyol fatty acid polyester' is intended to refer to any such polyesters or mixtures thereof of which, on an average, more than 70% of the polyol hydroxyl groups have been esterified with fatty acids. In this specification by 'indigestible' is meant that at least about 70% by weight of the material concerned is not digested by the human body.

According to yet another preferred embodiment the present emulsion contains an emulsifying system capable of promoting the coalescence of oil droplets in aqueous systems. Preferably an emulsifier is selected from the group consisting of sorbitan based nonionic emulsifiers polyglycerol esters, monoglycerides, lecithin, sucrose fatty acid esters, sorbitan fatty acid esters and mixtures thereof. Particularly preferred are emulsifiers which are unsaturated.

We have found that the emulsions in accordance with present invention can be prepared relatively easily provided that said emulsifying system displays a contact angle of at least 50°. The contact angle can suitably be measured by means of the method described in an article titled "The Role of Fat Crystals in Emulsion Stability" by I. J Campbell, 272-282, in Food Colloids, Proceedings of an International Symposium, 13-15 April 1988, using skim milk as the water phase. Depending on whether the emulsifier is water- or oil-soluble, said emulsifier is dissolved in either the water phase or the oil phase. The concentration level used in the measurement should correspond exactly to the concentration level to be incorporated in the emulsion. According to a preferred embodiment the emulsifier systems present in the emulsion displays a contact angle of at least 60°. Most preferably the latter emulsifier system exhibits a contact angle of at least 70°. Emulsifiers which have a contact angle greater than 70° are found among the saturated and unsaturated monoglycerides.

The present emulsion can contain protein e.g soy protein or, preferably, milk protein. The presence of a substantial amount of protein, in particular milk protein, in the aqueous phase generally has an advantageous effect on the taste of the product. Preferably the present emulsion contains at least 2% protein by weight of the aqueous phase. More preferably the plastic emulsion contains from 5% to 20% protein by weight of the aqueous phase.

The incorporation of starch in the present emulsion offers a further advantage, in that the starch enhances in-mouth thinning of the product due to amylase activity in the saliva. Preferably the present emulsion contains from 0.1% to 9.0% starch by weight of the aqueous phase. More preferably the present emulsion comprises 0.1 to 4.5% starch by weight of the aqueous phase. Preferably the starch used in the present emulsion is selected from the group consisting of native starch, cross-linked starch, hydrolyzed starch and mixtures thereof.

The advantages of the present invention are particularly appreciated in spreads, toppings and mayonnaise. Most preferably the present plastic emulsion is a spread and as such it is an beneficial low-calory butter or margarine substitute. The term "spread" not only includes low fat margarine, but also other spreadable products of very low fat content, such as cheese spreads, hazelnut spreads, peanut butter etc.

Another aspect of the present invention relates to a process for preparing the present emulsion, said process comprising the steps of:

(a) forming an oil-and-water mixture containing 5-21% oil, (b) homogenizing the oil-and-water mixture under such conditions that an oil-in-water dispersion is obtained wherein the oil-droplets have a volume weighted mean diameter of less than 5 microns, and (c) cooling the oil-in-water under such conditions that coalescence of the oil-droplets is induced.

The homogenization of the oil-in-water mixture may be carried out in any suitable homogenizing device known in the art. A suitable pressure is chosen from the range 20-500 bar, preferably 100-200 bar. In order to obtain small droplets a relative high pressure should be applied.

The cooling of the oil-in-water emulsion can be effect by passing said emulsion through, for instance, a cooling coil, a scraped surface heatexchanger etc. Cooling can be effected by passing the emulsion through a cooling device in which the emulsion is subjected to mild shear or no shear at all, e.g. a cooling coil, but, more preferably, a scraped surface heat exchanger is used. Preferred exit temperatures are in the range of 8°–18° C. In order to obtain a smooth, homogeneous spread it might be suitable to vary slightly the cooling conditions depending on the composition, as is usual in the art.

EXPERIMENTAL

General

Viscosity measurements have been carried out with a Ferranti Shirley TM viscometer.

The invention is illustrated by means of the following examples:

EXAMPLE 1

A bi-continuous very low fat spread was prepared on the basis of the following formulation:

| Ingredients | % by weight |
| --- | --- |
| Palm mid fraction[1] | 19.6 |

-continued

| | | | | | |
|---|---|---|---|---|---|
| Polyglycerol ester[2] | | | | 0.4 | |
| Potassium sorbate | | | | 0.075 | |
| Salt | | | | 0.375 | |
| Beta carotene (1% sol.) | | | | 0.08 | |
| Gelatin (220 bloom) | | | | 1.6 | |
| Flavour | | | | | |
| Lactic acid | | | | to pH 5.0 | |
| Water | | | | to 100% | |

[1]Fatty acid composition

| 12:0 | 14:0 | 16:0 | 18:0 | 18:1 | 18:2 | 18:3 | 20:0 | 22:0 |
|---|---|---|---|---|---|---|---|---|
| 0.3 | 1.0 | 53.4 | 8.1 | 32.5 | 3.8 | 0.1 | 0.6 | 0.2 |

Number of carbon atoms

| 44 | 46 | 48 | 50 | 52 | 54 | 56 | 58 | 60 |
|---|---|---|---|---|---|---|---|---|
| 0.1 | 0.7 | 5.1 | 67.3 | 20.4 | 5.9 | 0.4 | 0.1 | — |

Types of triglycerides
(S = saturated; O = oleic; L = linoleic)

| SSS | SOS | OSS | SLS | SOO | SLO/OOO |
|---|---|---|---|---|---|
| 5.1 | 71.6 | 7.0 | 8.0 | 6.2 | 1.7 |

[2]Triodan 20 TM

The spread was prepared by first preparing a pre-mix (oil-in-water emulsion) at 60° C. by mixing the aqueous phase and the fat phase without the flavor using a Silverson mixer. The mixture was homogenized at 200 bar and 60° C. Subsequently it was pasteurized at 80° C. for 3 minutes and then cooled to 60° C. The flavor was added and the pre-mix was pumped at 50 g/min. through a sequence of two scraped surface heat exchangers followed by a crystallizer (C-unit) all rotating at 1000 rpm. The temperature of the emulsion when leaving the first A-unit was 9° C., after the second A-unit it was 5° C. and after the C-unit it was 3° C. Upon leaving the C-unit the emulsion was filled into sealed tubs.

The product was stored at 10° C. for 1 week after which cylindrical samples of 12.5 mm radius and 30 mm height were cut from the filled tubs. The samples were loaded onto an Instron "Universal Tester fitted with a 1000 N load cell. An oversize crosshead was used to compress the cylindrical sample at a crosshead speed of 50 mm per minute. The relationship between stress and strain so observed was recorded using a chart speed of 200 mm/min. Samples were tested until three consistent results were obtained.

Also the aqueous phase composition, after having been equilibrated at 10° C. like the above sample, were sampled and measured as described above. The F-strain for the emulsion was found to be 27.8%, corresponding to a stress of $21.6 \times 10^3$ N/m$^2$. At the latter deformation the aqueous composition displayed a stress of $1.6 \times 10$hu 3 N/m$^2$. Thus at the F-strain the stress observed for the emulsion is 1350% higher than the stress measured for the aqueous phase at the same strain. A conductivity of 4360 microSiemens/cm was measured for the emulsion at 5° C. At the same temperature the aqueous phase was found to have a conductivity of 8070 microSiemens/cm.

EXAMPLE 2

Example 1 was repeated with the exception that gelatin was replaced by 0.15 wt. % guar gum. The F-strain was observed at a deformation of 5.9%, at which deformation a stress of $14.1 \times 10^3$ N/m$^2$ was measured. At the latter deformation the aqueous composition displayed a stress of 0 N/m$^2$. Conductivity measurements on emulsion and aqueous phase yielded figures of 3650 microSiemens/cm and 8100 microSiemens/cm respectively.

EXAMPLES 3-5

Bi-continuous very low fat spreads were prepared using the following ingredients:

| Ingredients | % by weight |
|---|---|
| Palm mid fraction[1] | 19.6 |
| Emulsifier[2] | 0.4 |
| Potassium sorbate | 0.075 |
| Sodium chloride | 0.375 |
| Beta carotene (1% sol.) | 0.08 |
| Guar gum | 1.6 |
| Butter milk powder | 3.75 |
| Flavour | 0.07 |
| Lactic acid | to pH 5.0 |
| Water | balance to 100% |

[1]Fatty acid composition, number of carbon atoms and types of triglycerides: see example 1.
[2]Emulsifiers:
example 3: lecithin (Bolec 2TD TM)
example 4: unsaturated monoglyceride (Hymono 7804 TM)
example 5: unsaturated tween (Tween 80 TM)

Example 1 was repeated, except that the pre-mix after addition of the flavor was processed through a votator (A-unit, shaft speed 1000 rpm) at 50 g/min. The emulsion had an exit temperature of 15° C. The product was collected and stored at 5° C.

Because the water phase was non-gelling, its F-stress was zero. The emulsions were characterized by the following rheological values:

| Example | F-strain | F-stress $*10^3$ Nm$^{-2}$ |
|---|---|---|
| 3 | 0.143 | 0.924 |
| 4 | 0.033 | 20.372 |
| 5 | — | 0.407 |

We claim:

1. Plastic edible emulsion comprising: a continuous fat phase, and a continuous aqueous phase, wherein the emulsion contains 5-21 wt. % fat and a stress observed at the F-strain when the stress is registered as a function of the strain applied is at least 10% higher than a stress observed for the continuous aqueous phase at the same strain.

2. Plastic edible emulsion according to claim 1, wherein the stress observed at the F-strain when the stress is registered as a function of the strain applied, is at least 25% higher than the stress observed for the aqueous phase composition at the same strain.

3. Plastic emulsion according to claim 1, wherein the F-strain is reached at less than 50% deformation.

4. Plastic emulsion according to claim 1, wherein the aqueous phase composition has a viscosity of more than 3 mPa.s when measured at a shear rate of 1709 s$^{-1}$ and 10° C.

5. Plastic emulsion according to claim 1, wherein the aqueous phase composition is a non-gelling composition.

6. Plastic emulsion according to claim 1, wherein the aqueous composition is gel-forming.

7. Plastic emulsion according to claim 1, wherein the ratio of the conductivity of the constituting aqueous phase and the conductivity of the emulsion is less than 10.

8. Plastic emulsion according to claim 1, which additionally contains an emulsifier.

9. Plastic emulsion according to claim 8, in which the emulsifier is selected from the group consisting of sorbitan based nonionic emulsifiers polyglycerol esters, monoglycerides, lecithin, sucrose fatty acid esters, sorbitan fatty acid esters and mixtures thereof.

10. Plastic emulsion according to claim 9, wherein the emulsifier displays a contact angle of at least 60°.

11. Plastic emulsion according to claim 1, wherein the aqueous phase contains at least one protein and at least one starch and displays an electrical conductivity in excess of 100 microSiemens/cm at 5° C.

12. Plastic emulsion according to claim 11, wherein the aqueous phase contains at least 2% protein by weight of aqueous phase and 0.1–9% starch by weight of aqueous phase.

13. Process for preparing a plastic edible emulsion according to claim 1, comprising the steps of:
 (a) forming an oil-and-water mixture containing 5–21 wt % fat;
 (b) homogenizing the oil-and-water mixture under such conditions that an oil-in-water dispersion is obtained wherein the oil droplets have a volume weighted mean diameter of less than 5 µm; and
 (c) cooling the oil-in-water dispersion under such conditions that coalescence of the oil droplets is induced and a plastic edible emulsion having a continuous aqueous phase and a continuous water phase is formed.

14. The process according to claim 13, wherein the forming step (a) further comprises: forming the oil and water mixture containing an emulsifying system.

* * * * *